UNITED STATES PATENT OFFICE.

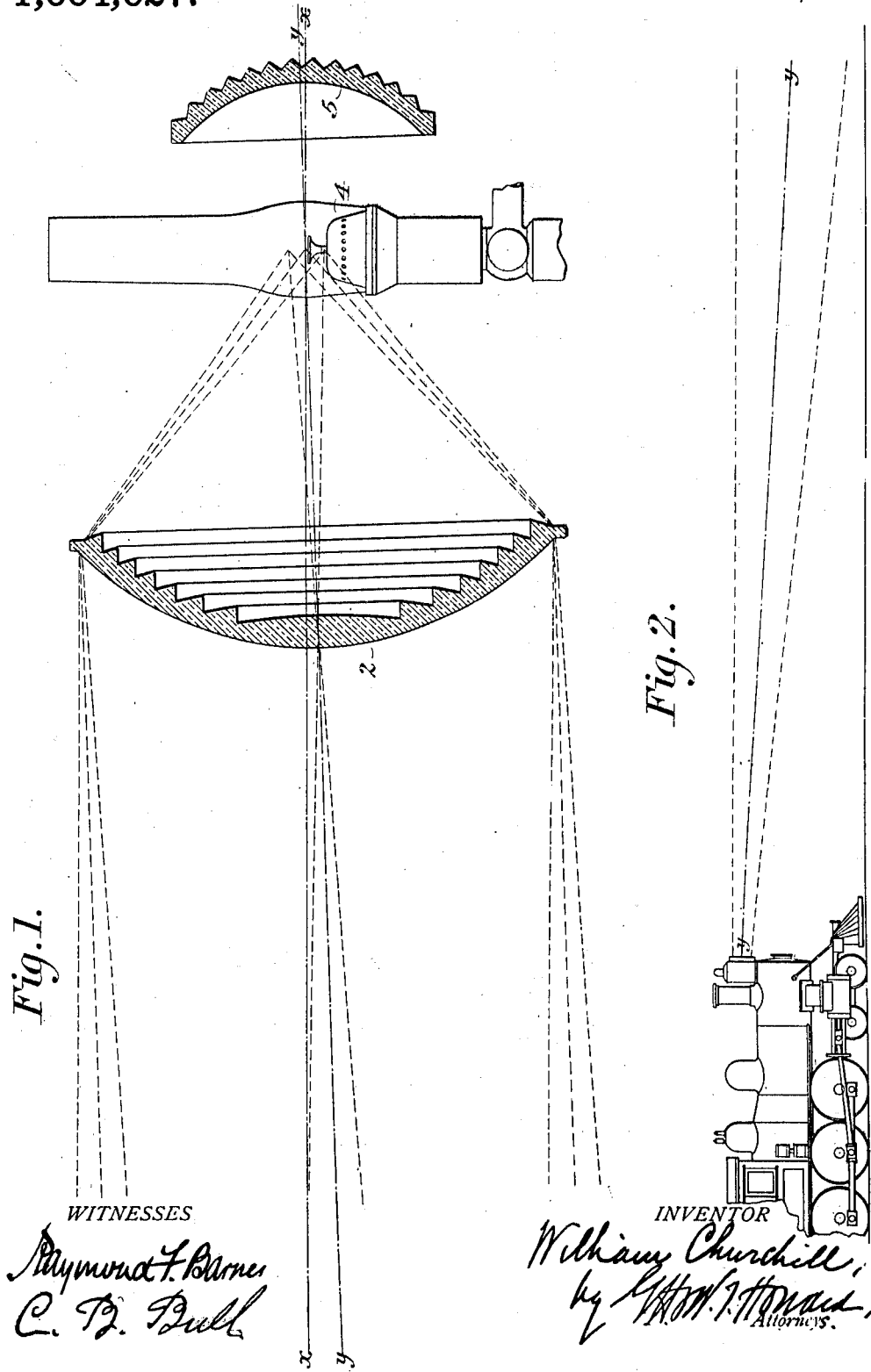

WILLIAM CHURCHILL, OF CORNING, NEW YORK, ASSIGNOR TO CORNING GLASS WORKS, OF CORNING, NEW YORK.

OPTICAL SYSTEM FOR HEADLIGHTS.

1,004,627.      Specification of Letters Patent.      Patented Oct. 3, 1911.

Application filed September 14, 1910. Serial No. 582,081.

*To all whom it may concern:*

Be it known that I, WILLIAM CHURCHILL, a citizen of the United States, residing at Corning, in the county of Steuben and State of New York, have invented new and useful Improvements in Optical Systems for Headlights, of which the following is a specification.

In accordance with the established principles of optics, the beam proceeding from a reflector, lens, or lens and reflector combination, when such optical devices are mounted in the usual manner—that is to say with the axis of the system parallel to the base of the lamp—consists of rays which spread with more or less divergence from the axis, such divergence being equal in amount both above and below the horizontal axis. Under such conditions, practically half the light emanating from the lamp is projected upward, above the level of the lamp, and thus proves of little or no service in illuminating the pathway directly in front of the locomotive or other vehicle upon which the headlight is mounted. It has been found by experience that the proper position for a headlight, when constructed in the usual manner, is that of being tilted slightly forward, the amount of such inclination depending upon the height of the headlight above the ground. By such tilting, the path of the headlight in front is more brilliantly illuminated, and there is much less liability that the light will dazzle the eyes of an observer coming in an opposite direction, because the axis of the beam is inclined downward. But when a headlight is thus inclined, particularly if an oil-burning headlight, there is an almost certain probability that the flame will not burn properly, and that the chimney will become smoked and liable to crack. Furthermore, if the amount of inclination necessary is left to the discretion of the engineer or other party responsible for the headlight, an error in the adjustment is likely to be made. Again, there are no brackets or stands on headlights providing suitable means for the tilting.

In carrying out my invention I build the optical combination into the headlight, the axis inclined away from the horizontal. In other words, when the lamp is rested squarely upon its base, the beam will be projected slightly downward, and tilting the lamp is, therefore, unnecessary. At the same time, the burner can be arranged to maintain a position vertical to the base of the lamp regardless of the fact that the lens, or lens and reflector, or reflector alone, are inserted upon an inclined axis.

The more important advantages thus attained may be mentioned as follows: I avoid the projection of light above a plane parallel to the track which, if allowed, may and probably will have the effect of reaching signals at the side of the track. These signals, as is known, are of various kinds, but in nearly all cases contain roundels of red, green and other colored glass, and it has been found that where a beam of light strikes such a signal a ray of colored light is frequently thrown back to the eye of the engineer thereby producing misleading signal indications. At the same time the reflected glare ordinarily produced from the upwardly projected rays and which greatly distorts and confuses his vision, is cut out.

Under my system as much of the track in the foreground as is practicable is illuminated without centering the rays upon any particular spot, such as is produced by any optical combination, as a bicycle lamp, when tilted sharply downward. It is especially important to avoid producing a spot of light at one particular point, as in the foreground or middle distance, which must have the effect of intensifying the darkness beyond. Such powerful illumination at one spot tends by contrast to produce the effect of total darkness at a greater distance, and thereby prevents the perception of objects which, with uniform illumination of a moderate degree, would be visible. In brief, in addition to the advantages attending my invention in the production of a steady light for the greatest feasible length of the track, it obviates the glare ordinarily emanating from upward beams from the headlight, the casting back of light or reflections to the eye of the engineer from signals or other objects which he is approaching, and also the contrasts of dazzle and darkness upon the track, all of which have been and are productive of many fatalities.

In the accompanying drawing, Figure 1 is an elevation, mainly in section, illustrating my invention, the headlight case being omitted. Fig. 2 shows on reduced scale the invention applied to a headlight and in the act of illuminating the track.

The lens is shown by 2, the lamp and burner by 4, and the reflector by 5. It will be seen that the lamp stands in a vertical line. What would be the horizontal axis of the system is represented by the line x—x. This line is parallel to the base of the headlight which in my invention is not tilted. To obtain the effects derived from tilting the headlight, I arrange the lens 2 and the reflector 5 upon an axis which is inclined away from the horizontal. This inclined axis is shown by the line y—y. It will be seen that the inner or straight face of the lens, and also that of the reflector, are at a right angle to this inclined axis, while the burner remains in a vertical line. This inclined arrangement is followed whether the lens is used with or without the reflector.

In Fig. 1 the dotted lines clearly show the direction of the rays from which it would appear there is a deviation from the path of the horizontal axis which tends to illuminate the pathway in front of the headlight much more efficiently than would be the case were half the light projected upward and away from the horizontal axis. Therefore my invention is intended to cover broadly the idea of so constructing or arranging an optical system for a headlight that the beam emanating from the same shall be projected in the proper direction, that is to say, slightly downward, thus obviating the practice of tilting the headlight.

Having thus described my invention, I claim:—

1. In an optical system for locomotive headlights, the combination of a casing, a lamp standing in a vertical line, and a lens located with its axis downwardly inclined from the horizontal to project a beam the upper limit of which diverges from the axis to a line substantially parallel to the track, and the lower limit of the beam diverges from the axis to illuminate the pathway without centering the rays upon the foreground or middle distance, the beam furthermore obviating back glare and interference with track signals, substantially as set forth.

2. In an optical system for locomotive headlights, the combination of a casing, a lamp, a lens and a reflector, the lens and reflector being arranged, respectively, forward of and in rear of the lamp, the lamp standing in a vertical line and the lens and reflector being located on a common axis downwardly inclined from the horizontal to project a beam the upper limit of which diverges from the axis to a line substantially parallel to the track, and the lower limit of the beam diverges from the axis to illuminate the pathway without centering the rays upon the foregound or middle distance, the beam furthermore obviating back glare and interference with track signals, substantially as set forth.

In testimony whereof I affix my signature in presence of two witnesses.

WILLIAM CHURCHILL.

Witnesses:
  LOTTIE P. STRAIT,
  E. P. STFRIFFER.